(12) United States Patent
Rossi et al.

(10) Patent No.: US 11,093,123 B1
(45) Date of Patent: Aug. 17, 2021

(54) SAVING CONTENT FOR VIEWING ON A VIRTUAL REALITY RENDERING DEVICE

(71) Applicant: Facebook Technologies, LLC, Menlo Park, CA (US)

(72) Inventors: Jacob Rossi, Seattle, WA (US); Joshua Jacob Inch, Seattle, WA (US); Jordan D. Andersen, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/597,543

(22) Filed: Oct. 9, 2019

(51) Int. Cl.
  *G06F 3/0482* (2013.01)
  *G06F 3/0484* (2013.01)
  *H04L 29/06* (2006.01)
  *G06F 3/14* (2006.01)

(52) U.S. Cl.
  CPC ............ *G06F 3/04842* (2013.01); *G06F 3/14* (2013.01); *H04L 65/60* (2013.01)

(58) Field of Classification Search
  CPC ......... G06F 3/04842; G06F 3/14; H04L 65/60
  See application file for complete search history.

(56) References Cited

U.S. PATENT DOCUMENTS

| 2011/0023069 | A1* | 1/2011 | Dowens | H04N 21/23109 725/61 |
| 2018/0189283 | A1* | 7/2018 | Barnett | H04L 51/32 |
| 2018/0189554 | A1* | 7/2018 | Sutton | G06Q 30/0271 |
| 2018/0190327 | A1* | 7/2018 | Coward | H04L 65/4084 |
| 2020/0051527 | A1* | 2/2020 | Ngo | G06F 3/011 |

* cited by examiner

*Primary Examiner* — Jeanette J Parker
(74) *Attorney, Agent, or Firm* — Foley & Lardner LLP (57) ABSTRACT

Systems and methods for rendering VR content at a VR rendering device include identifying, by a content facilitator, that that first content presented via a first device to a user includes metadata indicating availability of second content. The second content includes at least one of a three-dimensional (3D) video, 360° image, or virtual reality (VR) content. The content facilitator provides an interface element to the user at the first device responsive to the metadata indicating availability of the second content. The content facilitator receives a user selection of the interface element. The content facilitator provides access to the second content via a VR rendering device for the user responsive to the user selection. The VR rendering device is configured to render the second content.

18 Claims, 5 Drawing Sheets

SAVING CONTENT FOR VIEWING ON A VIRTUAL REALITY RENDERING DEVICE

FIELD OF DISCLOSURE

The present disclosure is generally related to saving virtual reality (VR) content for viewing, including but not limited to conveying VR content to a VR rendering device.

BACKGROUND

Artificial reality, such as a virtual reality (VR), an augmented reality (AR), or a mixed reality (MR), provides immersive experience to a user. In one example, a user wearing a head mounted display (HMD) can rotate the user's head, and an image of a virtual object corresponding to a location of the HMD and a gaze direction of the user can be displayed on the HMD to allow the user to feel as if the user is moving within a space of an artificial reality (e.g., a VR space, an AR space, or a MR space).

Artificial reality content may be available to users through various channels. Some users may run into such content at a time in which the user is not in possession of their HMD. Therefore, such users may not be capable of experiencing or interacting with the artificial reality content at that time.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods for saving virtual reality (VR) content (e.g., three-dimensional (3D) videos, 360° images, artificial reality (AR) content, or other VR content) for rendering at a VR rendering device. In one aspect, a content facilitator identifies that first content (e.g., a social media post, for instance) presented via a first device to a user includes metadata indicating availability of second content (e.g., content embedded, incorporated into, linked to or otherwise associated with the first content). The second content may include a three-dimensional (3D) video, 360° image, or virtual reality (VR) content. The content facilitator may provide an interface element (e.g., a button, drop-down menu option, etc.) to the user at the first device responsive to the metadata indicating availability of the second content. The content facilitator may receive a user selection of the interface element. The content facilitator may provide access to the second content via a VR rendering device (e.g., a HMD) for the user responsive to the user selection. The VR rendering device may be configured to render the second content. By providing the interface element to the user, the systems and methods described herein may provide a quick and convenient way in which VR content may be saved and subsequently retrieved by the user. A user need not possess their VR rendering device at all times to view VR content. Rather, the user may be selectively presented the interface element (e.g., when VR content is available to the user), and can select the interface element at the first device so that the VR rendering device may access the VR content.

Figure 1:
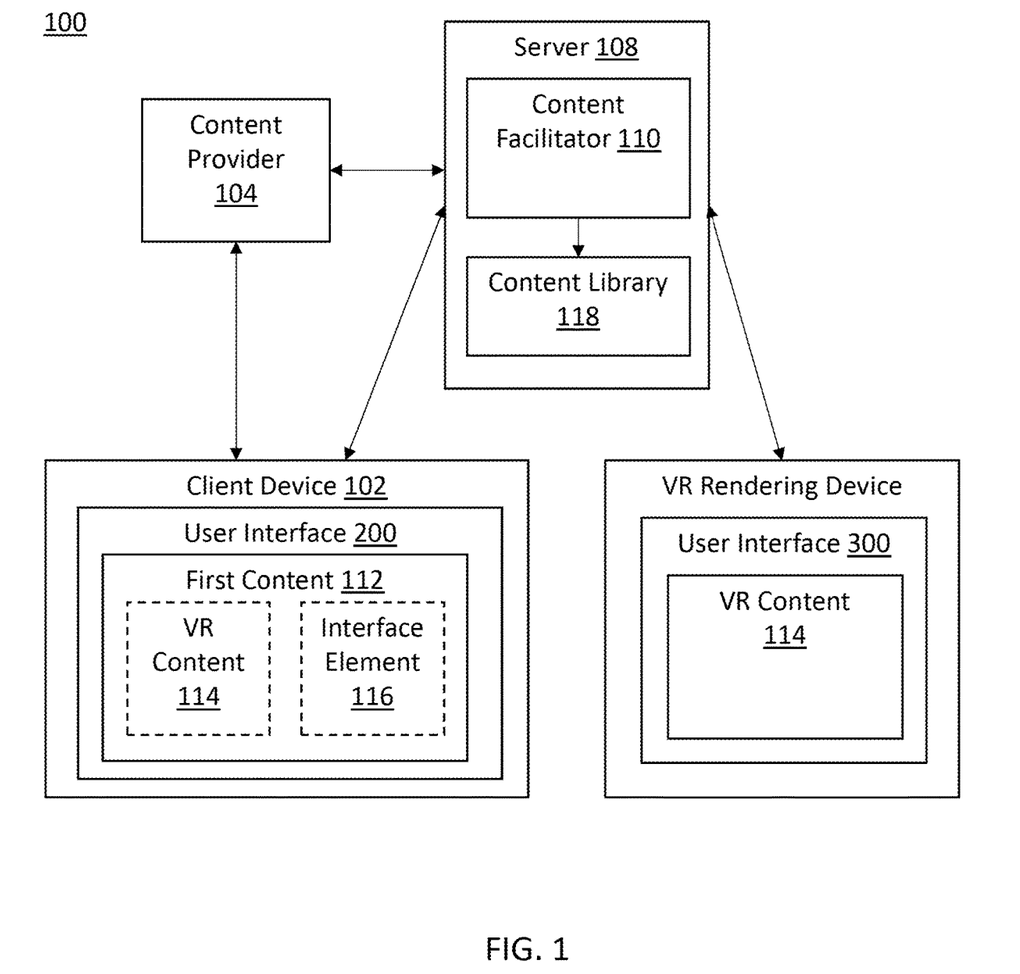
FIG. 1 is a diagram of a system for rendering content on a Virtual Reality (VR) rendering device, according to an example implementation of the present disclosure.

FIG. 1 is a block diagram of a system 100 for rendering content on a virtual reality (VR) rendering device, according to an illustrative embodiment. The system 100 includes a client device 102 configured to access a content provider 104, a VR rendering device 106, and a server 108. The server 108 may host a content facilitator 110. As described in greater detail below, the content facilitator 110 may be configured to identify that first content 112 presented via the client device 102 to a user indicates availability of VR content 114. The content facilitator 110 is configured to provide an interface element 116 to the user at the client device 102. When the user selects the interface element 116, the content facilitator 108 provides access to the VR content 114 via the VR rendering device 106.

Figure 5:
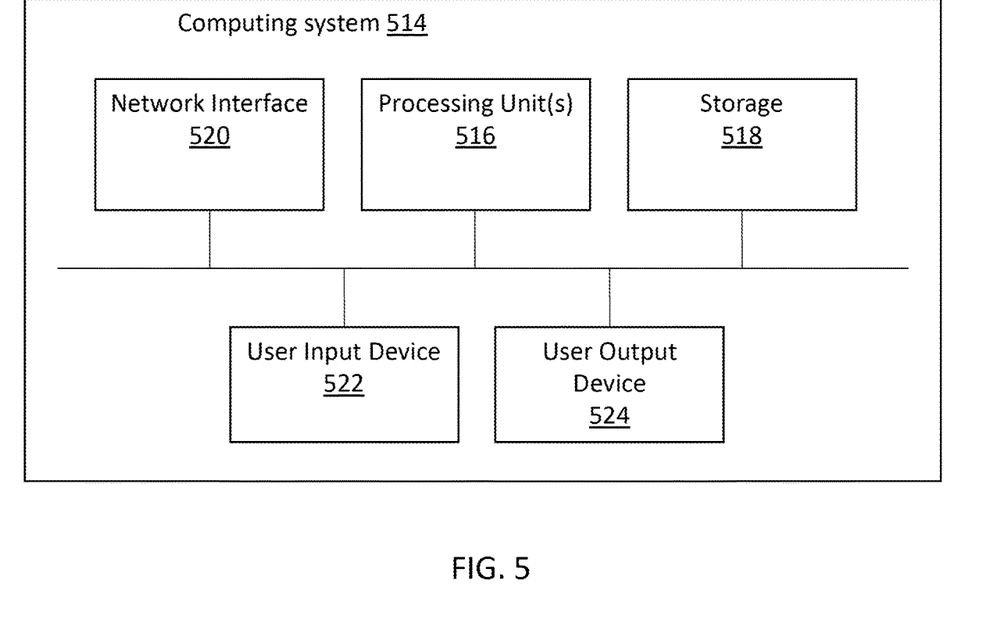
FIG. 5 is a block diagram of a computing environment according to an example implementation of the present disclosure.

Various components and elements of the system 100 may be implemented on or using components or elements of the computing environment shown in FIG. 5 and subsequently described. Furthermore, various components of the system 100 may be modified or embodied on different components. For instance, the content provider 104 may be embodied on a server, which may be the same as server 108, or a different server. Similarly, the content facilitator 110 may be embodied on the client device 102 or the VR rendering device 106. Accordingly, the present disclosure is not limited to the particular arrangements shown in FIG. 1.

The system 100 includes a client device 102. The client device 102 may be communicably coupled to the content provider 104 and server 108. In some implementations, the client device 102 is a mobile device (e.g., a smartphone, tablet, wearable device, etc.), a computer (e.g., a desktop or laptop computer), and so forth. The client device 102 may be associated with or operated by a user. The user may access various internet-based content via the client device 102. The user may access content hosted or otherwise associated with the content provider 104. The content provider 104 may be or include any device, component, or system designed or implemented to host and/or provision content which may be accessed by a user. The content provider 104 may be hosted on a server. In some implementations, the content provider 104 may be a component or feature of a software application, webpage or website, social media channel, and so forth which is accessible by users on their client device 102. Users may contribute, transmit, upload, send, or otherwise provide content from their client device 102 to the content provider 104 (e.g., via the software application, webpage or website, social media channel, etc.). Such content may be accessible by other users on their respective client device 102.

The system 100 includes a content facilitator 110 in some embodiments. In some implementations, the content facilitator 110 may be hosted on a server 108. In some implementations, the content facilitator 110 may be hosted on the client device 102 and/or the VR rendering device 106. As described in greater detail below, the content facilitator 110 may be configured to identify content 112 presented on the client device 102 to the user. The content facilitator 110 may be configured to selectively provide an interface element 116 to the user such that the user is provided with corresponding content 114 on the user's VR rendering device 106 (e.g., upon or responsive to selection of the interface element 116 by the user).

In some implementations, the client device 102 may be configured to access content 112 from a plurality of content providers 104. The client device 102 may be configured to access some content 112 via an application programming interface (API) or software development kit (SDK) or other plug-in type software available from, installed with or associated with the content providers 104. The client device 102 is configured to render content 112 to the user. The content 112 may include, for instance, text, images, videos, etc. In some implementations, the content 112 may be associated with additional content 114. The content 114 may be embedded or incorporated within, linked to, or otherwise associated with the content 112. In some instances, the content 114 may include VR content, such as three-dimensional (3D) videos, 360° images, augmented reality (AR) content, etc. In some embodiments, the VR content may include a link to view the VR content. In some embodiments, the VR content may include an invitation to view the VR content (e.g., at a set or scheduled time or date). In these and other embodiments, the content 114 may include or otherwise be associated with VR content. The content 112, 114 may be retrieved by the client device 102 from the content provider 104 (e.g., upon or responsive to selecting or launching a widget associated with a software application, accessing webpage or website, accessing a social media channel, etc.). The content 112 may be rendered at the client device 102 via a user interface 118 associated with the content provider 104. In some instances, the client device 102 may be configured to render some of the content received from the content provider 104. For instance, the client device 102 may be configured to render two-dimensional (2D) content 112, but not VR content 114. In some instances, the client device 102 may be configured to render the VR content 114 in a non-immersive manner.

Figure 2:
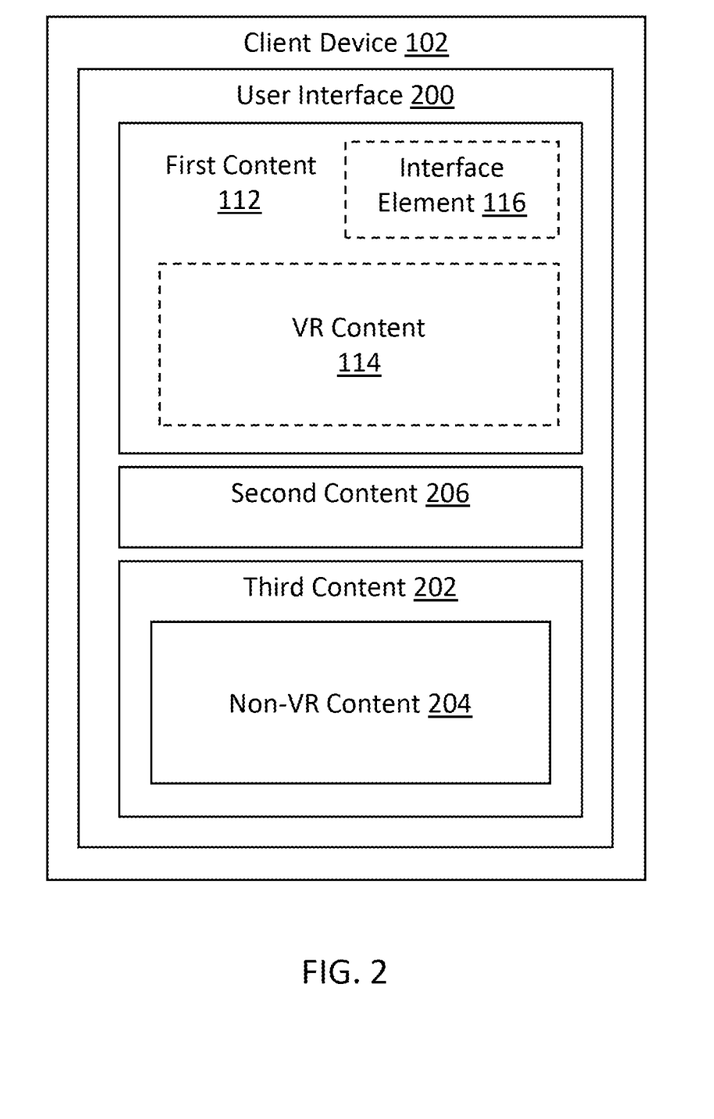
FIG. 2 is an example user interface for rendering content at a client device, according to an example implementation of the present disclosure.

Referring now to FIG. 1 and FIG. 2, the client device 102 may be configured to receive content from the content provider 104. FIG. 2 shows an example user interface 200 for rendering content at the client device 102, according to an illustrative embodiment. In some instances, the content may be from a plurality of different content providers 104. Some content may include further content which is associated therewith (also referred to herein as associated content). For instance, as shown in FIG. 2, the first content 112 and third content 202 may include associated content 114, 204. On the other hand, some content (such as the second content 206) may not include associated content. The associated content may include VR content (e.g., such as the VR content 114 associated with first content 112), or non-VR content (e.g., such as the non-VR content 204 associated with the third content 202).

The content provider(s) 104 may send, transmit, or otherwise provide the content to the client device 102 (e.g., via suitable wireless and/or wired connections). The content provider 104 may be configured to include or provide metadata with the content. For instance, the metadata for the content 112, 202 from the content provider 104 may indicate that the associated content 114, 204 is available to the user. The metadata may indicate a creation date (e.g., a date upon which the content was generated), a submission or upload date (e.g., a date upon which the content was uploaded to the content provider 104), a source, creator or generator of the content, a type of the content (e.g., non-VR content, VR content), a classification or genre of the content, etc.

The content facilitator 110 may be configured to detect, determine, or otherwise identify the content which is provided via the client device 102 to the user. In implementations in which the content facilitator 110 is installed, hosted or embodied on a server 108, the content may be transmitted from the content provider(s) 104, through the content facilitator 110 (e.g., via an API for the content provider(s) 104), to the client device 102. In implementations in which the content facilitator 110 is installed, hosted or embodied on the client device 102, the content facilitator 110 may receive the content 112 from the content provider 104 for rendering at the client device 102.

The content facilitator 110 may be configured to identify, classify or recognize the content received from the content provider 104 for rendering at the client device 102 to the user. The content facilitator 112 may be configured to parse the metadata received from the content provider 104 and associated with the content. The content facilitator 110 may be configured to identify (e.g., based on the parsed metadata) that the content indicates availability of associated content (e.g. VR content). Continuing the example shown in FIG. 2, the content facilitator 110 may be configured to identify the associated content 114, 204 for the content 112, 202. The content facilitator 110 may be configured to parse metadata for the content 114, 204 associated with content 112, 202. The content facilitator 110 may parse the metadata for the content 114, 204 to determine a type of the content 114, 204. The content facilitator 110 may be configured to determine that the content 114 is VR content (e.g., 3D video, 360° image, or other immersive content) based on the metadata for the content 114. The content facilitator 110 may be configured to determine that the content 114 is VR content based on, for instance, a file extension for the content 114. On the other hand, the content facilitator 110 may be configured to the determine that the content 204 is non-VR content (e.g., text, a 2D image or video, etc.) based on the metadata for the content 114.

The content facilitator 110 may be configured to selectively provide an interface element 116 to the user at the client device 102. The interface element 116 may include an interface or interactive element such as a button or widget included on the user interface 200, a drop-down option for the user interface 200, etc. In some implementations, the interface element 116 may be provided as a button, widget, drop-down option, etc., for individual content items. The content facilitator 110 may be configured to provide the interface element 116 to the user based on whether content includes associated VR content. As shown in FIG. 2, the content facilitator 110 may be configured to provide the interface element 116 for the first content 112, as the first content 112 includes VR content 114 associated therewith. On the other hand, the content facilitator 110 may be configured to withhold the interface element 116 for the second and third content 206, 202, as the second content 206 does not include any associated content, and the third content 202 includes non-VR content 204 associated therewith.

The interface element 116 may be rendered to the user at the client device 102. The interface element 116 may be selectable by a user of the client device 102. The interface element 116 may trigger access to the associated content 114 at the VR rendering device 106. The interface element 116 may include text (e.g., embedded within the interface element 116, located around the interface element 116, or otherwise label the interface element) which indicates that the interface element 116 triggers access to the associated content 114 at the VR rendering device 106. For example, the text may state "Render at the VR rendering device", "Save to VR", or similar text.

The content facilitator 110 may be configured to determine, detect, identify, or otherwise receive a user selection of the interface element 116. The content facilitator 110 may be configured to receive the user selection from the client device 102. The client device 102 may register, identify, or otherwise detect the user selection of the interface element 116 at the user interface 200. The client device 102 may be configured to transmit, send, or otherwise provide data corresponding to the user selection to the content facilitator 110. The data may indicate selection of the interface element 116. The data may indicate or identify the VR content 114 corresponding to the interface element 116 which was selected by the user. The content facilitator 110 may be configured to identify the user selection, and the VR content 114 associated with the interface element 116 selected by the user.

Figure 3:
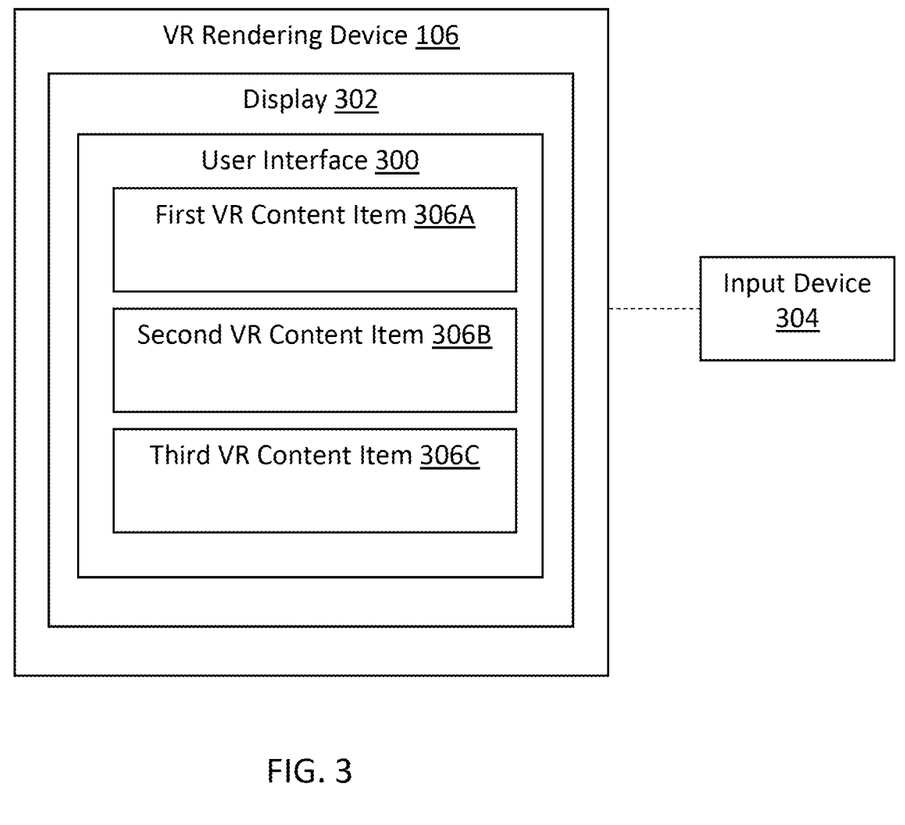
FIG. 3 is a block diagram of a VR rendering device, according to an illustrative embodiment.

Referring now to FIG. 1 and FIG. 3, the system 100 is shown to include a VR rendering device 106. Specifically, FIG. 3 depicts a block diagram of a VR rendering device 106, according to an illustrative embodiment. The VR rendering device 106 may include or correspond to any device or component designed or implemented to render VR content. The VR rendering device 106 may be configured to render a user interface 300 on a display 302 of the VR rendering device 106. The display 300 may be mounted to a wearable head unit such that, when the wearable head unit is positioned on the user's head, the display faces the user's eyes. The VR rendering device 106 may include an input device 302. The input device 302 may be communicably coupled (e.g., through suitable wired or wireless coupling) to the display such that a user can provide inputs to the VR rendering device 106. Such inputs can include, for instance, selection of VR content items 304 for rendering corresponding VR content at the VR rendering device 106. The VR rendering device 106 may render one or more images, video, audio, or some combination thereof to provide an AR/VR/MR experience to the user. In some embodiments, audio is presented via an external device (e.g., speakers and/or headphones) that receives audio information from the VR rendering device 106 or other devices, and presents audio based on the audio information. In some embodiments, the VR rendering device 106 includes sensors, eye trackers, a communication interface, an adaptive image renderer, an electronic display 300, a lens, and a compensator. Generally speaking, these components may operate together to detect a location of the VR rendering device 106 and a gaze direction of the user wearing the VR rendering device 106, and render an image of a view within the artificial reality corresponding to the detected location of the VR rendering device 106 and the gaze direction of the user.

Referring back to FIG. 1, the content facilitator 110 may be configured to provide access to the VR content 114 via the VR rendering device 106 (such that the VR rendering device 106 can render the VR content 114 to the user). The content facilitator 110 may be configured to provide access to the VR content 114 responsive to receiving the selection of the interface element 116. As described in greater detail below, the content facilitator 110 may be configured to provide access to the VR content 114 by linking the VR content 114 to a content library 118 associated with the user, by storing the VR content 114 to the content library 118, causing the client device 102 to stream or download the VR content 114 to the VR rendering device 106, and so forth.

The content facilitator 110 may be configured to determine whether a user of the client device 102 has an account associated with the VR rendering device 106. The content facilitator 110 may be configured to determine whether the user has an account (e.g., VR account, social media account, content account or any such accounts linked together) based on data received from the client device 102 (e.g., during enrollment or registration of the client device 102 with the content facilitator 110). The user may be prompted (e.g., during enrollment or registration) to provide log-in credentials (e.g., for the account). The account may be an account associated with the VR rendering device 106, a social media account, an email account, etc. The content facilitator 110 may be configured to receive the data from the client device 102, and identify the data corresponding to the account for the user. The content facilitator 110 may be configured to use the account for the user for storing, linking, or otherwise associating VR content with a content library 118 and/or a VR rendering device associated with the user.

The system 100 is shown to include a content library 118. The content library 118 may include a database, data structure, or other type or form of digital library designed or implemented to store data corresponding to content for a user. While shown as embodied on the server 108 (e.g., a cloud-based content library 118), in some implementations, the content library 118 may be stored locally (e.g., on the VR rendering device 106 and/or on the client device 102). In some instances, the content library 118 may include a database or ledger which includes links to VR content (such as VR content 114) and an identifier associated with a user (e.g., an IP address of the client device 102, a username for a social media account of the user, a name of the user, or other type of information uniquely associated with the user). In some instances, the content library 118 may include a data structure configured to store VR content in association with an identifier associated with a user. In these and other embodiments, the content library 118 is generally configured to include data corresponding to VR content which is associated with a user. When the user selects the interface element 116 for VR content (such as VR content 114), the content facilitator 110 may be configured to store, include, link, or otherwise associate the VR content to the content library 118.

The VR rendering device 106 may be configured to access the content library 118 to retrieve the VR content 114 associated with the user for rendering the VR content 114 to the user. The VR rendering device 106 may be linked to an account of the user (e.g., an account associated with the VR rendering device 106, a social media account, etc.). Similarly, data from the content library 118 may be linked to the account of the user. As such, the VR rendering device 106 may be configured to retrieve or otherwise access data from the content library 118 using information corresponding to the account of the user. The VR rendering device 106 may be configured to perform a look-up function using data corresponding to the user (e.g., account data, an identifier of the VR rendering device 106, an identifier of the client device 102, etc.) in the content library 118 for retrieving data corresponding to the VR content associated with the user. As further VR content is stored or linked to the content library 118 for the user, the VR rendering device 106 may be configured to access the content library 118 for retrieving such VR content.

The VR rendering device 106 may be configured to render the VR content to the user. As shown in FIG. 3, the VR rendering device 106 may be configured to provide a plurality of VR content items 306A-306C to the user (e.g., on the user interface 300 for the VR rendering device 106). The VR content items 306A-306C may be associated with VR content in the content library 118 for the user. The VR content items 306A-306C may include text within a list of VR content items associated with VR content, thumbnails corresponding to portions of the VR content, etc. The VR rendering device 106 may be configured to sort the VR content items 306A-306C (e.g., based on date in which the user interface element 116 associated with the corresponding VR content item in the content library 118 was selected by the user, based on creation date of the VR content, based on category or genre of the VR content item, etc.). The user may position the VR rendering device 106 on the user's head and select (e.g., using the input device 304) the VR content item 306 for rendering the corresponding VR content at the VR rendering device 106. The VR rendering device 106 may access the content library 118 for retrieving or otherwise rendering the selected VR content to the user (e.g., on the display 302). The VR rendering device 106 may access the link for the VR content in the content library 118 and retrieve the VR content from the server corresponding to the link, download the VR content stored in the content library 114, stream the VR content from the content library 114 to the VR rendering device 106, etc.

In some implementations, the VR rendering device 106 is configured to determine a time difference between a first time associated with the user selection (of the interface element 116) and a second time associated with usage of the VR rendering device 106. The VR rendering device 106 may be configured to identify a time of the selection of the interface element 116 (e.g., based on data received from the client device 102 directly or through the content facilitator 110). The VR rendering device 106 may be configured to detect usage of the VR rendering device 106 (e.g., by detecting a wake-up or event registered at the VR rendering device 106, by detecting user inputs on the input device 304 of the VR rendering device 106, etc.). The VR rendering device 106 may be configured to determine a time of detected usage of the VR rendering device 106 (e.g., based on a timestamp associated with the usage of the VR rendering device 106). The VR rendering device 106 may be configured to compute a time difference using the time of the user selection and the timestamp. The VR rendering device 106 may be configured to render VR content responsive to the time difference satisfying a temporal threshold. The temporal threshold may be a duration of time between, for instance, selection of the interface element 116 and placing the VR rendering device 106 on the user's head. The time difference may satisfy the temporal threshold when the time difference is less than (or equal to) the temporal threshold. By comparing the time difference to the temporal threshold and automatically rendering the VR content, the systems and methods described herein may infer that the user intends or is interested to view the VR content based on the user selecting the interface element 116 and using the VR rendering device 106 in a relatively short or reasonable amount of time.

In some implementations, the VR rendering device 106 may be configured to automatically render the VR content associated with a content item 306 based on a period of user inactivity. The VR rendering device 106 may render the user interface 300 including a first VR content item 306A. The first VR content item 306A may be the VR content item 306 associated with the most recently selected interface element 116 for VR content. The VR rendering device 106 may select the first VR content item 306A as a default VR content item 306A for selection by the user. The VR rendering device 106 may be configured to detect user inactivity (e.g., based on the user not operating the input device 304 to select the VR content item 306A or to select a different VR content item 306B, 306C). The VR rendering device 106 may be configured to automatically render the VR content associated with the first VR content item 306A based on the user inactivity (e.g., indicating indifference to or approval of the default VR content item 306A).

In some implementations, the VR rendering device 106 may be configured to receive VR content directly from the client device 102 (e.g., responsive to selecting the interface element 116). In other words, the client device 102 may be configured to stream the VR content to the VR rendering device 106 for rendering. For instance, the VR rendering device 106 and client device 102 may be wirelessly coupled to one another (e.g., via a Bluetooth or Wi-Fi connection or pairing). The client device 102 may communicate the VR content to the VR rendering device 106 without saving or storage to the content library 118. In this regard, the VR content may be temporarily shared to the VR rendering device 106.

Figure 4:
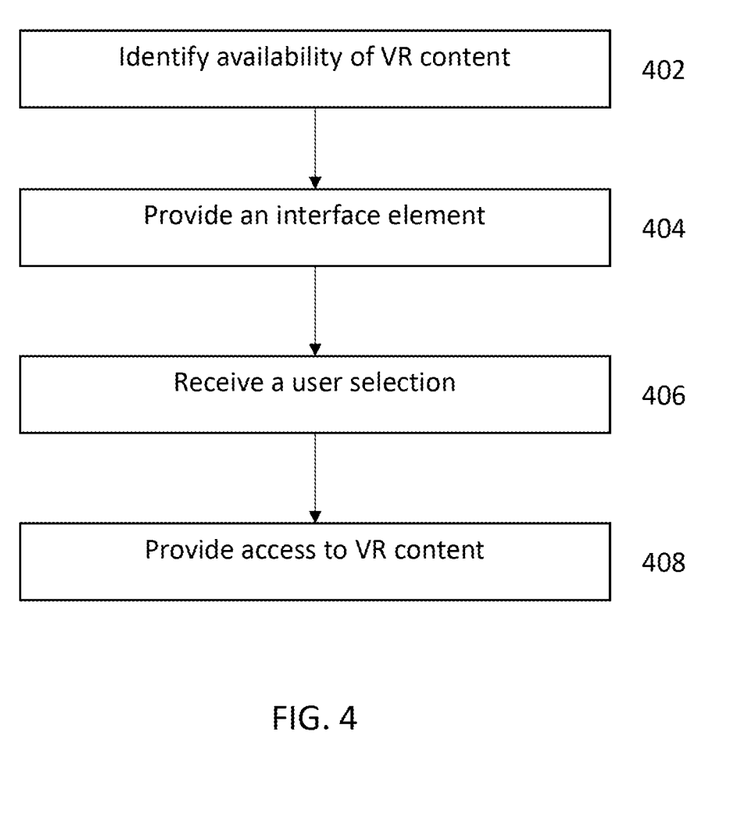
FIG. 4 is a flow chart illustrating a process of rendering content on a VR rendering device, according to an example implementation of the present disclosure.

Referring now to FIG. 4, depicted is a flowchart showing a process 400 of rendering content on a VR rendering device, according to an illustrative embodiment. The steps of the method 400 may be implemented by the components and elements described above with reference to FIG. 1-FIG. 3, such as the client device 102, content provider 104, VR rendering device 106, and/or server 108. In brief overview, at step 402, a content facilitator identifies availability of VR content. At step 404, the content facilitator provides an interface element. At step 406, the content facilitator receives a user selection. At step 408, the content facilitator provides access to the VR content.

At step 402, a content facilitator identifies availability of VR content. In some embodiments, the content facilitator may identify that first content presented via a first device (e.g., client device) to a user includes metadata indicating availability and/or the type of second content (e.g., VR content). The VR content may include a three-dimensional (3D) video, 360° image, or other VR content. The user may access the first content on the first device through a social media channel, software application (e.g., on the client device), a webpage or website, etc. The user may have an account with a content provider associated with the social media channel, software application, webpage, etc. The account may be, for instance, a social media account. The user may provide account information to the client device (e.g., during enrollment or registration of the client device, during log-in, etc.). The client device may provide account information to the content facilitator.

The user may access the first content following selection of a widget or button on the client device associated with the content provider, by launching an internet browser and accessing a website for the webpage associated with the content provider, etc. The client device may request content from the content provider using the account information associated with the user of the client device. The content provider may route, transmit, send, or otherwise provide the content to the client device. In implementations in which the content facilitator is embodied on the client device, the content may be provided from the content provider directly to the client device and received by the content facilitator. In implementations in which the content facilitator is located separate from the client device (e.g., embodied on a server), the content provider may provide content to the client device through the content facilitator.

The content may include a social media post having content associated therewith. The associated content may include VR content, as described above. The VR content may be embedded or incorporated within the social media post, linked to the social media post, etc. The content facilitator may parse the content to identify that VR content is associated therewith. The content facilitator may identify the VR content is available to the user based on metadata for the social media post. The metadata may indicate that content is associated with the social media post, and may indicate a type of the associated content (e.g., by including a file extension of the associated content, by including a classification of the associated content, etc.). The content facilitator may parse the metadata to determine that the associated content is VR content.

At step 404, the content facilitator provides an interface element. In some embodiments, the content facilitator provides the interface element to the user at the client device responsive to the metadata indicating availability of the VR content. The content facilitator may provide the interface element in association with the content corresponding to the VR content. For instance, where the content is a social media post and the VR content is embedded within the social media post, the content facilitator may provide the interface element for the social media post. The content facilitator may selectively provide the interface element. The content facilitator may provide the interface element where metadata for content indicates availability of VR content, and refrain from providing the interface element where metadata for content does not indicate availability of VR content (e.g., that the content does not include any associated content, or the associated content is non-VR content). The interface element may be provided as a button for the content, a drop-down option for a drop-down menu for the content, etc. The interface element may indicate the availability of providing access to the associated VR content to a VR rendering device of the user. The VR rendering device may be linked to or communicatively coupled to the client device of the user. The VR rendering device may be linked by the user logging into a common account for the client device and VR rendering device, registering an account with the VR rendering device, by the client device and VR rendering device sharing a common network connection, by the client device and VR rendering device being paired, etc.

At step 406, the content facilitator receives a user selection. In some embodiments, the content facilitator receives a user selection of the interface element. The user may provide the user selection of the interface element on the client device. The content facilitator may receive the user selection from the client device. In some embodiments, the content facilitator may receive data corresponding to the user selection. The data may include an event indicating the user selection (e.g., a user selection event), an indication identifying the content (or associated VR content), a timestamp of the user selection, etc. The content facilitator may identify receive the data corresponding to the user selection. The content facilitator may parse the data to determine that the user selected the interface element. The content facilitator may parse the data to identify the VR content associated with the user selection.

At step 408, the content facilitator provides access to the VR content. In some embodiments, the content facilitator provides access to the VR content via a VR rendering device. The content facilitator may provide access to the VR content responsive to the user selection. The VR rendering device may be configured to render the VR content. The content facilitator may provide access to the VR content identified as corresponding to the user selection. The VR rendering device may receive the VR content (e.g., from a content library, from a content provider using a link from the content library, from the client device, etc.). The VR rendering device may render the VR content to the user. As described in greater detail below, in some instances, the VR rendering device may automatically render the VR content, may render the VR content responsive to a user selection of the VR content, etc.

In some embodiments, the content facilitator may determine that the user has an account for the VR rendering device. The content facilitator may provide access to the VR content via the user's account for the VR rendering device. The content facilitator may determine the user has an account for the VR rendering device using data from the client device. The data may be the log-in credentials, metadata, data received during enrollment or registration of the client device with the content facilitator, identifying information corresponding to the client device (e.g., an IP address for the client device), identifying information corresponding to the user (e.g., an email address, username, pin, etc.). The content facilitator may cross-reference the data from the client device with data corresponding to account holders for respective VR rendering devices. The content facilitator may determine that the user has an account with a VR rendering device based on such analysis.

The content facilitator may provide access to the VR content via the user's account for the VR rendering device by linking, storing, or otherwise associating the VR content with a content library for the user's account. In some embodiments, the content facilitator may provide access to the VR content by causing establishment of a link between a content library of the user and the VR content. The link may be an address to a server which hosts the VR content. The content facilitator may store the link (e.g., rather than the VR content) on the content library. The VR rendering device may access the content library (e.g., using the account information for the user), and access the server hosting the VR content using the link in the content library. In some embodiments, the content facilitator may provide access to the VR content by causing the VR content to be stored in the content library of the user. In this regard, the content library may store the VR content locally, rather than storing links to the VR content. Such implementations may be more costly from a storage perspective, but more efficient from a content delivery standpoint (particularly where the content library is local to the VR rendering device). The VR rendering device may access the VR content by retrieving the VR content directly from the content library.

In some embodiments, the content facilitator may provide access to the VR content by wirelessly streaming the VR content from the first device to the VR rendering device. The VR rendering device and client device may be communicably coupled to one another (e.g., wirelessly or through a wired connection). The VR rendering device and client device may be communicably coupled to one another by being connected to a common network (e.g., Wi-Fi or other similar network), by being paired with one another (e.g., via Bluetooth or other type or form of pairing), etc. The client device may transmit the VR content to the VR rendering device via such suitable coupling. The client device may transmit the VR content to the VR rendering device without any storage of the VR content on the content library. As such, the VR content may be temporarily shared with the VR rendering device.

In some embodiments, the VR rendering device may present a plurality of content items via a user interface of the VR rendering device. The VR rendering device may present a content item for the VR content (e.g., identified at step 402). The content items may include a list of VR content associated with the user, a plurality of thumbnails for the VR content, etc. The VR rendering device may sort the content items provided to the users. The VR rendering device may sort the content items based on the corresponding VR content. The VR rendering device may sort the content items by date/time of user selection of the interface element, by creation date of the VR content, by category or genre of the VR content, by creator of the VR content, etc. Such data may be included in the metadata used and described above at step 402. The VR rendering device may receive a selection of one of the content items (e.g., via an input device for the VR rendering device operated or otherwise controlled by the user). The VR rendering device may render the VR content corresponding to the selected content item (e.g., by retrieving the VR content from the content library, retrieving or requesting the VR content from the client device, etc.).

In some embodiments, the VR rendering device may render VR content based on a period of user inactivity (e.g., user inaction). The VR rendering device may render VR content corresponding to a default VR content item. The default VR content item may be the content item corresponding to the most recent user selection of an interface element for VR content. In this regard, the VR rendering device may default to rendering the VR content to which the user was most recently provided access. The VR rendering device may detect user inactivity (e.g., by not receiving any user inputs from the input device for selecting the default VR content item or selecting a different VR content item). The VR rendering device may determine that the user intends to view VR content for the default VR content item based on the user not selecting alternative VR content. The VR rendering device may render the VR content when the user does not select any alternative VR content (or provide any other inputs) for a period of time (e.g., a period of inactivity or inaction).

In some embodiments, the VR rendering device may determine a time difference between a first time associated with the user selection and a second time associated with usage of the VR rendering device. The VR rendering device may render the content responsive to the time difference satisfying a temporal threshold. The VR rendering device may determine the first time based on the data corresponding to the received user selection (e.g., the timestamp of the user selection). The VR rendering device may determine the second time based on data corresponding to usage of the VR rendering device. The data may include detected events (e.g., an event when the user places the VR rendering device on the user's head, an event when the user selects a button on the VR rendering device to wake up or turn on the VR rendering device, user inputs from the input device associated with the VR rendering device, etc.). Each of these events may include corresponding timestamps. The VR rendering device may determine the time difference by computing a difference between the corresponding timestamps. The VR rendering device may compare the time difference to a temporal threshold. The temporal threshold may be a threshold of time which indicates the user intends to view content which was recently selected. The temporal threshold may be satisfied where the determined time difference is less than (or equal to) the temporal threshold. The VR rendering device may automatically render the VR content to the user when the determined time difference satisfies the temporal threshold. Such implementations may be more user-friendly by automatically rendering the VR content to the user when it is likely that the user intends to view the VR content (e.g., by selecting the interface element and using the VR rendering device in a relatively short amount of time).

Various operations described herein can be implemented on computer systems. FIG. 5 shows a block diagram of a representative computing system 514 usable to implement the present disclosure. In some embodiments, the client device 102, VR rendering device 106, or both of FIG. 1 are implemented by the computing system 514. Computing system 514 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 514 can be implemented to provide VR, AR, MR experience. In some embodiments, the computing system 514 can include conventional computer components such as processors 516, storage device 518, network interface 520, user input device 522, and user output device 524.

Network interface 520 can provide a connection to a wide area network (e.g., the Internet) to which WAN interface of a remote server system is also connected. Network interface 520 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 522 can include any device (or devices) via which a user can provide signals to computing system 514; computing system 514 can interpret the signals as indicative of particular user requests or information. User input device 522 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 524 can include any device via which computing system 514 can provide information to a user. For example, user output device 524 can include a display to display images generated by or delivered to computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 516 can provide various functionality for computing system 514, including any of the functionality described herein as being performed by a server or client, or other functionality associated with message management services.

It will be appreciated that computing system 514 is illustrative and that variations and modifications are possible. Computer systems used in connection with the present disclosure can have other capabilities not specifically described here. Further, while computing system 514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

The invention claimed is:

1. A method, comprising:
   identifying, by a content facilitator, that first content presented via a first device to a user includes metadata indicating availability of second content, the second content comprising at least one of a three-dimensional (3D) video, 180° or 360° image or video, or virtual reality (VR) content;
   providing, by the content facilitator, an interface element to the user at the first device responsive to the metadata indicating availability of the second content;
   receiving, by the content facilitator, a user selection at the first device of the interface element;
   providing, by the content facilitator responsive to the user selection, access to the second content via a second device for the user, wherein the second device comprises a VR rendering device configured to render the second content and determine a time difference between a first time associated with the user selection and a second time associated with usage of the VR rendering device.

2. The method of claim 1, further comprising rendering the second content at the VR rendering device responsive to at least one of: selection of the second content via the VR rendering device, a period of user inactivity, or a time difference between a first time associated with the user selection and a second time associated with usage of the VR rendering device satisfying a temporal threshold.

3. The method of claim 1, wherein providing access to the second content comprises causing establishment of a link between a content library of the user and the second content.

4. The method of claim 1, wherein providing access to the second content comprises causing the second content to be stored in a content library of the user.

5. The method of claim 1, further comprising presenting a plurality of content items including a content item for the second content, via a user interface of the VR rendering device.

6. The method of claim 1, further comprising:
   determining, by the content facilitator, that the user has an account for the VR rendering device; and
   providing, by the content facilitator, access to the second content via the user's account for the VR rendering device.

7. The method of claim 1, wherein the first content is presented via the first device through at least one of: a social media channel, a software application, or a webpage.

8. The method of claim 1, wherein providing access to the second content comprises wirelessly streaming the second content from the first device to the VR rendering device.

9. The method of claim 1, further comprising:
   identifying, by the content facilitator, that third content presented via the first device to the user includes fourth content, the fourth content comprising at least one of two-dimensional content, a website link, or social media group;
   providing, by the content facilitator, a second interface element to the user at the first device;
   receiving, by the content facilitator, a second user selection of the second interface element; and
   providing, by the content facilitator responsive to the second user selection, access to the fourth content via the VR rendering device, the VR rendering device configured to render the fourth content.

10. A system, comprising:
one or more processors;
a non-transitory storage medium communicably coupled to the one or more processors and storing instructions for implementing a content facilitator, the content facilitator configured to:
identify that first content presented via a first device to a user includes metadata indicating availability of second content, the second content comprising at least one of a three-dimensional (3D) video, 360° image, or virtual reality (VR) content;
provide an interface element to the user at the first device responsive to the metadata indicating availability of the second content;
receive a user selection at the first device of the interface element; and
provide, responsive to the user selection, access to the second content via a second device for the user, wherein the second device comprises a VR rendering device configured to render the second content and determine a time difference between a first time associated with the user selection and a second time associated with usage of the VR rendering device.

11. The system of claim 10, wherein the VR rendering device is configured to render the second content responsive to the time difference satisfying a temporal threshold.

12. The system of claim 10, wherein the VR rendering device is configured to render the second content responsive to at least one of: selection of the second content via the VR rendering device, or a period of user inactivity.

13. The system of claim 10, wherein providing access to the second content comprises causing establishment of a link between a content library of the user and the second content.

14. The system of claim 10, wherein providing access to the second content comprises causing the second content to be stored in a content library of the user.

15. The system of claim 10, wherein the second device is configured to present a plurality of content items including a content item for the second content, via a user interface of the VR rendering device.

16. The system of claim 10, wherein the content facilitator is further configured to:
determine that the user has an account for the VR rendering device; and
provide access to the second content via the user's account for the VR rendering device.

17. The system of claim 10, wherein the first content is presented via the first device through at least one of: a social media channel, a software application, or a webpage.

18. The system of claim 10, wherein the first device provides access to the second content by wirelessly streaming the second content from the first device to the VR rendering device.

* * * * *